(12) United States Patent
Wang et al.

(10) Patent No.: US 9,618,822 B2
(45) Date of Patent: Apr. 11, 2017

(54) DEVICE AND METHOD FOR ALL-OPTICAL INFORMATION EXCHANGE

(71) Applicant: Huawei Technologies Co., Ltd., Shenzhen (CN)

(72) Inventors: Jian Wang, Wuhan (CN); Jifang He, Shenzhen (CN); Hongyan Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/068,158

(22) Filed: Mar. 11, 2016

(65) Prior Publication Data
US 2016/0195792 A1 Jul. 7, 2016

Related U.S. Application Data

(63) Continuation of application No. PCT/CN2014/075538, filed on Apr. 16, 2014.

(30) Foreign Application Priority Data

Sep. 13, 2013 (CN) .......................... 2013 1 0419699

(51) Int. Cl.
| | | |
|---|---|---|
| H04B 10/00 | (2013.01) | |
| G02F 1/35 | (2006.01) | |
| H04B 10/291 | (2013.01) | |
| H04Q 11/00 | (2006.01) | |
| G02F 2/00 | (2006.01) | |
| G02B 6/27 | (2006.01) | |

(Continued)

(52) U.S. Cl.
CPC ......... *G02F 1/3521* (2013.01); *G02B 6/2746* (2013.01); *G02B 6/2766* (2013.01);
(Continued)

(58) Field of Classification Search
CPC ...... G02F 1/3521; G02F 1/353; G02F 1/3558; G02F 1/365; G02F 2/004; G02F 2002/006;
(Continued)

(56) References Cited

U.S. PATENT DOCUMENTS

| 7,251,382 B2 * | 7/2007 | Han ........................ G02B 6/274 |
| | | 356/519 |
| 7,978,319 B2 * | 7/2011 | Okabe .................. G01R 13/347 |
| | | 356/364 |

(Continued)

FOREIGN PATENT DOCUMENTS

| CN | 1404190 A | 3/2003 |
| CN | 1490658 A | 4/2004 |

(Continued)

OTHER PUBLICATIONS

Chou et al., "Multiple-channel wavelength conversion by use of engineered quasi-phase-matching structures in LiNBO$_3$ waveguides," Optics Letters, vol. 24, No. 16, pp. 1157-1159, Optical Society of America, Washington, DC (Aug. 15, 1999).

(Continued)

*Primary Examiner* — M. R. Sedighian
(74) *Attorney, Agent, or Firm* — Leydig, Voit & Mayer, Ltd.

(57) ABSTRACT

An all-optical information exchange device and method are provided. The all-optical information exchange device includes: a second-order nonlinear optical waveguide, a first optical coupler, a third optical coupler, a fourth optical coupler, a first optical filter, a second optical filter and a first polarization controller; the first optical filter is transmissive to a first wavelength/waveband signal light, and the second optical filter is transmissive to a second wavelength/waveband signal light during use.

9 Claims, 11 Drawing Sheets

(51) Int. Cl.

| | | |
|---|---|---|
| *G02B 6/293* | (2006.01) | |
| *G02F 1/355* | (2006.01) | |
| *G02F 1/365* | (2006.01) | |
| *H04J 14/02* | (2006.01) | |
| *H04J 14/06* | (2006.01) | |

(52) U.S. Cl.
    CPC ....... *G02B 6/2938* (2013.01); *G02B 6/29361* (2013.01); *G02F 1/353* (2013.01); *G02F 1/3558* (2013.01); *G02F 1/365* (2013.01); *G02F 2/004* (2013.01); *H04B 10/291* (2013.01); *H04J 14/02* (2013.01); *H04J 14/06* (2013.01); *H04Q 11/0005* (2013.01); *G02F 2002/006* (2013.01); *H04Q 2011/0035* (2013.01); *H04Q 2213/1301* (2013.01)

(58) Field of Classification Search
    CPC G02B 6/2746; G02B 6/2766; G02B 6/29361; G02B 6/2938; H04B 10/291; H04J 14/02; H04J 14/06; H04Q 11/0005; H04Q 2011/0035; H04Q 2213/1301
    USPC ............ 398/152, 65, 82, 85, 141, 142
    See application file for complete search history.

(56) References Cited

U.S. PATENT DOCUMENTS 9,319,170 B2 * 4/2016 Okabe .................... H04J 14/06

2006/0045536 A1   3/2006  Arahira
2010/0067923 A1   3/2010  Arahira
2010/0220997 A1*  9/2010  Futami ................... G02F 2/004
                                                                398/34

FOREIGN PATENT DOCUMENTS

| CN | 101303507 B | 4/2011 |
|---|---|---|
| CN | 102547492 A | 7/2012 |
| CN | 102931567 A | 2/2013 |
| EP | 1130456 A2 | 9/2001 |

OTHER PUBLICATIONS

Saruwatari et al, "Wavelength-flexible optical signal conversion using a NOLM-based XPM circuit followed by a Brillouin-assisted notch-filtering technique," International Conference on Phtonics in Switching, pp. 1-3, Institute of Electrical and Electronics Engineers, Reston, Virginia (Oct. 16-18, 2006).

Uesaka et al., "Wavelength Exchange in a Highly Nonlinear Dispersion-Shifted Fiber: Theory and Experiments," IEEE Journal of Selected topics in Quantum Electronics, vol. 8, No. 3, pp. 560-568, Institute of Electrical and Electronics Engineers, Reston, Virginia (May/Jun. 2002).

Wang et al., "Phase-transparent optical data exchange of 40 Gbit/s differential phase-shift keying signals," Optics Letters, vol. 35, No. 17, pp. 2979-2981, Optical Society of America, Washington, DC (Sep. 1, 2010).

* cited by examiner

DEVICE AND METHOD FOR ALL-OPTICAL INFORMATION EXCHANGE

CROSS-REFERENCE TO RELATED APPLICATIONS

This application is a continuation of International Patent Application No. PCT/CN2014/075538, filed on Apr. 16, 2014, which claims priority to Chinese Patent Application No. 201310419699.0, filed on Sep. 13, 2013, both of which are hereby incorporated by reference in their entireties.

FIELD

The present disclosure relates to the technical field of communications, and in particular to an all-optical information exchange device and method.

BACKGROUND

In a wavelength division multiplexing (Wavelength Division Multiplexing, WDM) optical communication system, the all-optical information exchange technology involves a specific manifestation of implementing exchange of data information carried by two different wavelengths, and it is further desired that data information carried by multiple wavelengths or wavebands can be exchanged. Therefore, it is a subject of intensive research that how to implement the all-optical information exchange.

SUMMARY

In view of this, the object of the embodiments of the present disclosure is to provide an all-optical information exchange device and method, so as to implement the all-optical information exchange.

To achieve the above object, technical solutions are provided according to the embodiments of the present disclosure as follows.

An all-optical information exchange device is provided according to a first aspect of an embodiment of the present disclosure, which at least includes: a second-order nonlinear optical waveguide, a third optical coupler, a fourth optical coupler, a first optical filter, a second optical filter and a first polarization controller, where, a first port of the polarization controller is configured to be an input port for a WDM signal light, and a second port of the polarization controller is connected to a first port of the first optical coupler;

a second port of the first optical coupler is configured to be an output port for the WDM signal light, a third port of the first optical coupler is connected to a first port of the first optical filter, and a fourth port of the first optical coupler is connected to a first port of the second optical filter;

a second port of the first optical filter is connected to a first port of the third optical coupler, and second port of second optical filter is connected to a first port of the fourth optical coupler;

a first port of the second-order nonlinear optical waveguide is connected to a third port of the third optical coupler, a second port of the second-order nonlinear optical waveguide is connected to a third port of the fourth optical coupler;

a second port of the third optical coupler and a second port of the fourth optical coupler are configured to be input ports for a control light respectively; and the WDM signal light includes a first wavelength/waveband signal light and a second wavelength/waveband signal light, the first optical filter is transmissive to the first wavelength/waveband signal light, and the second optical filter is transmissive to the second wavelength/waveband signal light during use.

In conjunction with the first aspect, the device further includes a first optical isolator according to a first implementation, where the second port of the polarization controller is connected to the first port of the first optical coupler via the first optical isolator, an input port of the first optical isolator is connected to the second port of the first polarization controller, and an output port of the first optical isolator is connected to the first port of the first optical coupler.

In conjunction with the first aspect or the first implementation of the first aspect, the device further includes a second optical coupler according to a second implementation, where a first port of the second optical coupler is connected to the second port of the third optical coupler, and a second port of the second optical coupler is connected to the second port of the fourth optical coupler.

In conjunction with the second implementation of the first aspect, the device further includes a control-light providing device according to a third implementation.

In conjunction the third implementation of the first aspect, the control-light providing device includes at least one of a control-light generating device and a second polarization controller according to a fourth implementation.

In conjunction with the fourth implementation, the device further includes a second optical isolator according to a fifth implementation, where a first port of the second polarization controller is connected to an output port of the control-light generating device, a second port of the second polarization controller is connected to an input port of the second optical isolator, and an output port of the second optical isolator is connected to a third port of the second optical coupler.

In conjunction with the first aspect, the first implementation of the first aspect, the second implementation of the first aspect, the third implementation of the first aspect, the fourth implementation of the first aspect or the fifth implementation of the first aspect, the second-order nonlinear optical waveguide includes an optical waveguide with a second-order nonlinear optical effect according to a sixth implementation, and the second-order nonlinear optical effect may be a double-frequency effect, a sum-frequency effect or a difference-frequency effect.

In conjunction with the sixth implementation of the first aspect, the optical waveguide with the second-order nonlinear optical effect is a periodically-poled lithium niobate optical waveguide according to a seventh implementation.

In conjunction with the first aspect, the first implementation of the first aspect, the second implementation of the first aspect, the third implementation of the first aspect, the fourth implementation of the first aspect, the fifth implementation of the first aspect, the sixth implementation of the first aspect or the seventh implementation of the first aspect, an all-optical information exchange method is provided according to a second aspect of an embodiment, the method is applied to exchanging the data information carried by the first wavelength/waveband signal light and the second wavelength/waveband signal light in the WDM signal light;

where the method includes:

exchanging the data information carried by the first wavelength/waveband signal light and the second wavelength/ waveband signal light in the WDM signal light, with the all-optical information exchange device, in a case that preset conditions are met; and the preset conditions includes: the first optical filter is transmissive to the first wavelength/waveband signal light; the second optical filter is transmissive to the second wavelength/waveband signal light; a polarization state corresponding to the second-order nonlinear optical waveguide, a polarization state of the inputted WDM signal light and a polarization state of the control light are consistent; a wavelength of the control light is equal to a quasi-phase-matched wavelength of the second-order nonlinear optical waveguide; and a frequency of the control light is equal to a half of a sum of a center frequency of the first wavelength/waveband signal light and a center frequency of the second wavelength/waveband signal light.

It follows that, according to the embodiments of the present disclosure, under the second-order nonlinear effect, the data information carried by the two wavelength/waveband signal lights can be exchanged, thereby implementing the all-optical information exchange.

BRIEF DESCRIPTION OF THE DRAWINGS

In order to more clearly illustrate technical solutions in embodiments of the present disclosure or in the conventional technology, drawings used in the description of the embodiments or the conventional technology are introduced briefly hereinafter. Apparently, the drawings described in the following illustrates some embodiments of the present disclosure, other drawings may be obtained by those ordinarily skilled in the art based on these drawings without any creative efforts.

DETAILED DESCRIPTION OF THE EMBODIMENTS

For the purpose of reference and clarity, technical terms, abbreviations and short forms are summarized and explained as follows:

WDM: wavelength division multiplexing, wavelength division multiplexing

QPM: quasi phase matched, quasi phase matched.

The technical solutions in embodiments of the present disclosure are clearly and completely described hereinafter in conjunction with the drawings in the embodiments of the present disclosure. Apparently, the described embodiments are only a few of the embodiments of the present disclosure. Based on the embodiments of the present disclosure, all other embodiments obtained by those ordinarily skilled in the art without any creative efforts fall within the protection scope of the present disclosure.

Figure 1:
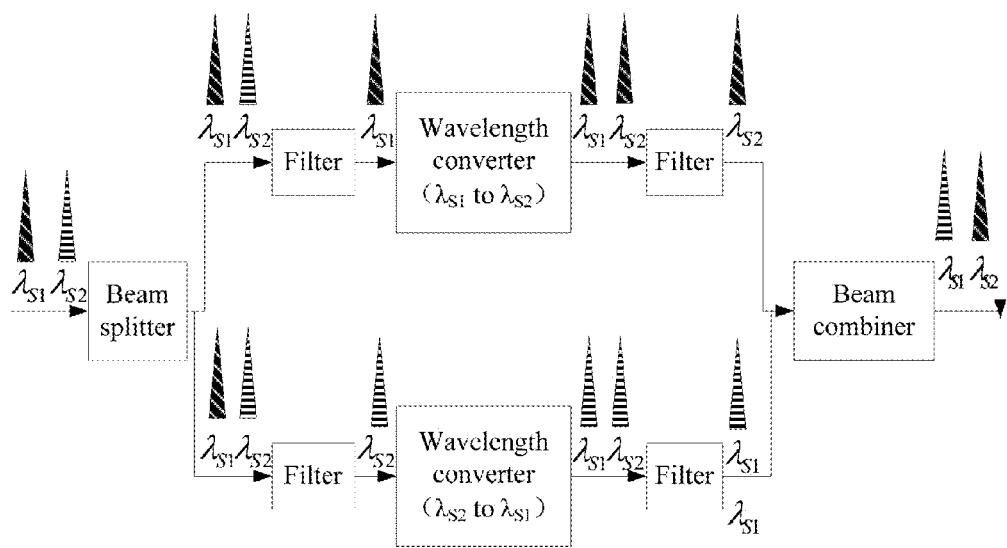
FIG. 1 is a schematic diagram of all-optical information exchange according to an embodiment of the present disclosure.

As shown in FIG. 1, exchange of data information carried by two optical wavelengths (the wavelengths of two signal lights are $\lambda_{S1}$ and $\lambda_{S2}$ respectively) in the conventional technology of all-optical information exchange is taken as an example, and the process are described as follows.

Demultiplexing is performed on a multiplexed signal light with two optical fibers, to obtain a first signal light (the wavelength $\lambda_{S1}$) and a second signal light (the wavelength is $\lambda_{S2}$). Then, two separate wavelength conversions are implemented on the first signal light and the second signal light respectively with two wavelength converters. The wavelength of the first signal light is converted to $\lambda_{S2}$ from $\lambda_{S1}$ and the wavelength of the second signal light is converted to $\lambda_{S1}$ from $\lambda_{S2}$ after the wavelength conversions are implemented. In addition, after each of the wavelength conversions, the converted first signal light and the converted second signal light are filtered out with additional optical filters, and finally multiplexing is performed on the two signal lights on which the information exchange is implemented. In a multiplexed signal light formed by multiplexing the two signal light, the signal light with a wavelength of $\lambda_{S2}$ carries the data information once carried by the signal light with an original wavelength of $\lambda_{S1}$, and the signal light with a wavelength of $\lambda_{S1}$ carries the data information once carried by the signal light with an original wavelength of $\lambda_{S2}$ thereby implementing the all-optical information exchange.

The conventional technology in the above description has the following defect that the whole process includes multiple optical filtering processes and multiple optical wavelength conversions, and optical components, such as two wavelength converters and four optical filters, are used. Therefore, the system is complex and the cost is high.

In order to meet the subject of intensive research of the all-optical information exchange and address the problem in the conventional technology that the system is complex and the cost is high, an all-optical information exchange device and an all-optical information exchange method based on the all-optical information exchange device are provided according to the embodiments of the present disclosure.

Figure 2:
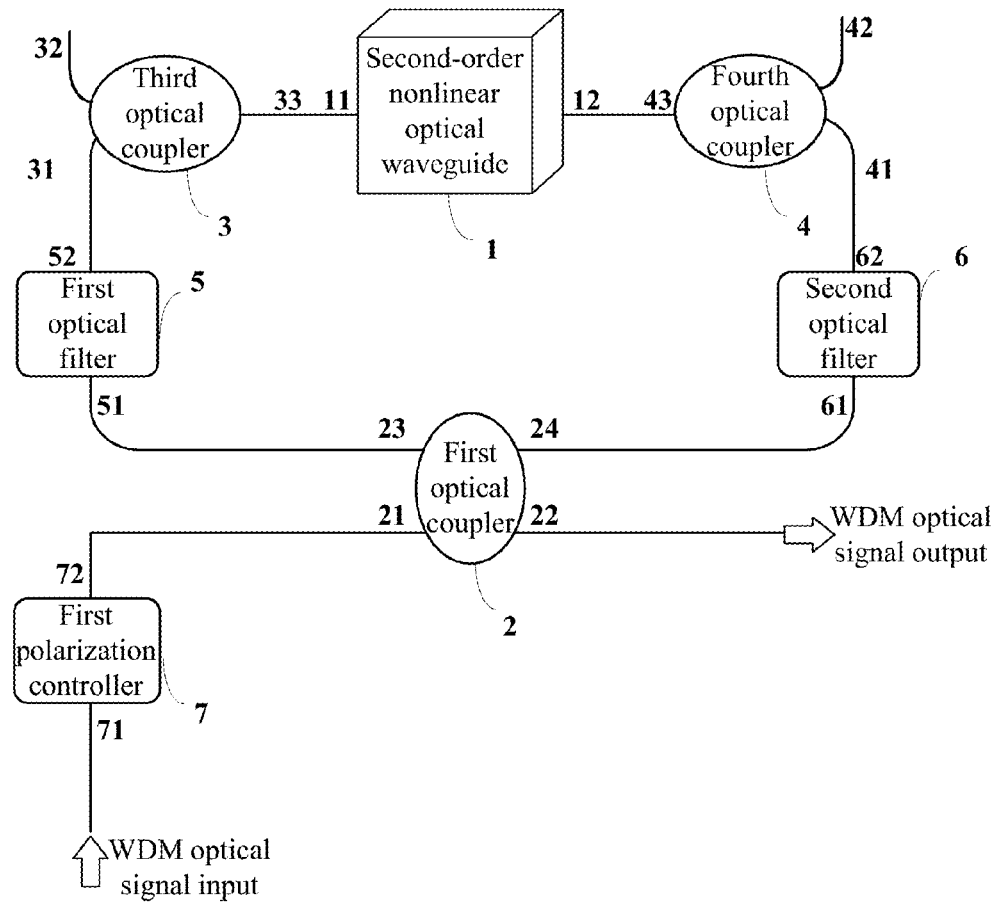
FIG. 2 is a schematic structural diagram of an all-optical information exchange device according to an embodiment of the present disclosure.

Reference is made to FIG. 2, the all-optical information exchange device may at least include the following components:

a second-order nonlinear optical waveguide 1, a first optical coupler 2, a third optical coupler 3, a fourth optical coupler 4, a first optical filter 5, a second optical filter 6 and a first polarization controller 7, where, a first port 71 of the first polarization controller 7 functions as an input port for a WDM signal light, and a second port 72 of the first polarization controller 7 is connected to a first port 21 of the first optical coupler 2;

a second port 22 of the first optical coupler 2 functions as an output port for the WDM signal light, a third port 23 of the first optical coupler 2 is connected to a first port 51 of the first optical filter 5, and a fourth port 24 of the first optical coupler 2 is connected to a first port 61 of the second optical filter 6;

a second port 52 of the first optical filter 5 is connected to a first port 31 of the third optical coupler 3, and second port 62 of second optical filter 6 is connected to a first port 41 of the fourth optical coupler 4;

a first port 11 of the second-order nonlinear optical waveguide 1 is connected to a third port 33 of the third optical coupler 3, and a second port 12 of the second-order nonlinear optical waveguide 1 is connected to a third port 43 of the fourth optical coupler 4;

a second port 32 of the third optical coupler 3 and a second port 42 of the fourth optical coupler 4 function as input ports for a control light; and the WDM signal light includes a first wavelength/waveband signal light and a second wavelength/waveband signal light, and the first wavelength/waveband signal light may pass through the first optical filter 5 and the second wavelength/waveband signal light may pass through the second optical filter 6 during the use. The first optical filter 5 and the second optical filter 6 may be low-pass filters, high-pass filters, band-pass filters, band-stop filters or other filters of more complex type, as long as the desired wavelengths/wavebands can be filtered out with the filters.

It should be noted that, the first port 21 and the second port 22 of the first optical coupler 2 are located on a same side, and the third port 23 and the fourth port 24 are located on the other side. Similarly, the first port 31 and the second port 32 of the third optical coupler 3 are located on a same side, and the third port 33 is located on the other side. The first port 41 and the second port 42 of the fourth optical coupler 4 are located on a same side, and the third port 43 is located on the other side A signal light can not be transmitted between two ports located on a same side, but can be transmitted between two ports located on different sides. Therefore, a signal light can not be transmitted between the first port 21 and the second port 22 of the first optical coupler 2, but can be transmitted between the first port 21 and the third port 23, between the first port 21 and the fourth port 24, between the second port 22 and the third port 23, and between the second port 22 and the fourth port 24.

Similarly, a signal light can not be transmitted between the first port 31 and the second port 32 of the third optical coupler 3, but can be transmitted between the third port 33 and the first port 31, and between the third port 33 and the second port 32; a signal light can not be transmitted between the first port 41 and the second port 42 of the fourth optical coupler 4, but can be transmitted between the third port 43 and the first port 41, and between the third port 43 and the second port 42.

In a process of implementing all-optical information exchange, a WDM signal light is input from the first port 21 of the first optical coupler 2 and finally output from the second port 22, and a control light is input from the second port 32 of the third optical coupler 3 and the second port 42 of the fourth optical coupler 4.

Figure 3:
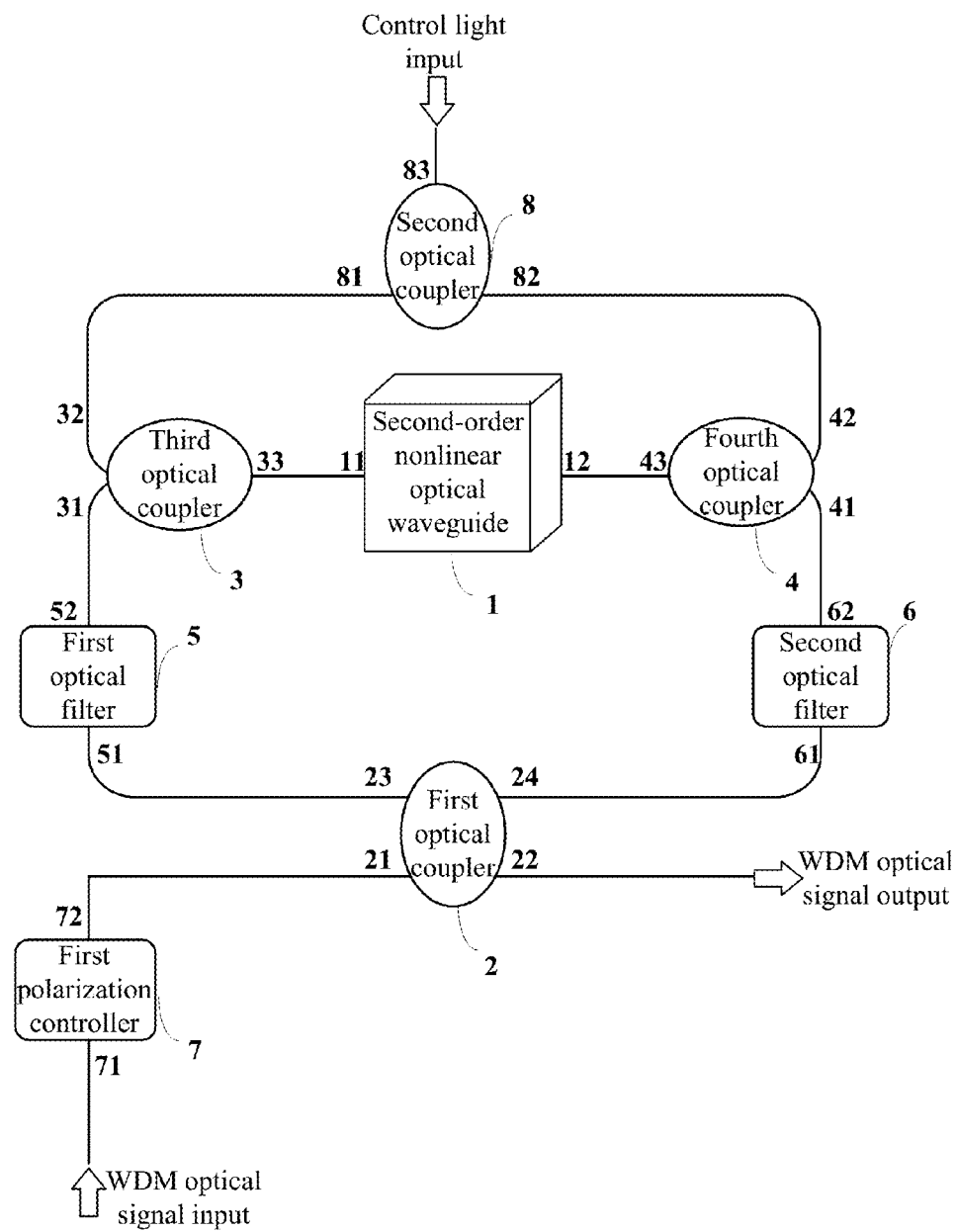
FIG. 3 is a schematic structural diagram of an all-optical information exchange device according to an embodiment of the present disclosure.

In other embodiments of the present disclosure, other components may be added to realize that the control light is input from the second port 32 of the third optical coupler 3 and the second port 42 of the fourth optical coupler 4. For example, a second optical coupler 8 may be added, as shown in FIG. 3. A first port 81 of the second optical coupler 8 is connected to the second port 32 of the third optical coupler 3, and a second port 82 of the second optical coupler 8 is connected to the second port 42 of the fourth optical coupler 4.

The first port 81 and the second port 82 of the second optical coupler 8 are located on a same side, and a third port 83 is located on the other side. Therefore, a signal light can not be transmitted between the first port 81 and the second port 82, but can be transmitted between the third port 83 and the first port 81 and between the third port 83 and the second port 82. The control light can be input from the third port 83, then be output from the first port 81 and the second port 82 respectively, and then input to the second port 32 of the third optical coupler 3 and the second port 42 of the fourth optical coupler 4 respectively.

More specifically, the second optical coupler 8 may be a power-equally-divided optical coupler, so that the control light can be equally input to the second port 32 and the second port 42. Similarly, the other optical couplers described above may also be power-equally-divided optical couplers.

Before introducing how the above components cooperate with each other to implement the all-optical information exchange, the operation principle of the second-order nonlinear optical waveguide is described.

The second-order nonlinear optical waveguide refers to an optical waveguide device with a second-order nonlinear optical effect, and the second-order nonlinear optical effect may be a double-frequency effect, a sum-frequency effect or a difference-frequency effect.

Taking a single-wavelength signal light as an example, it is assumed that a wavelength of the signal light is $\lambda_S$ and a wavelength of the control light is $\lambda_P$, a polarization state corresponding to the second-order nonlinear optical waveguide, a polarization state of the WDM signal light and a polarization state of the control light are consistent, and the wavelength $\lambda_P$ of the control light is equal to a quasi-phase-matched (QPM) wavelength of the second-order nonlinear optical waveguide. It should be noted that, being consistent may means being identical, since the result is best in a case that the three polarization states are identical.

Figure 4:
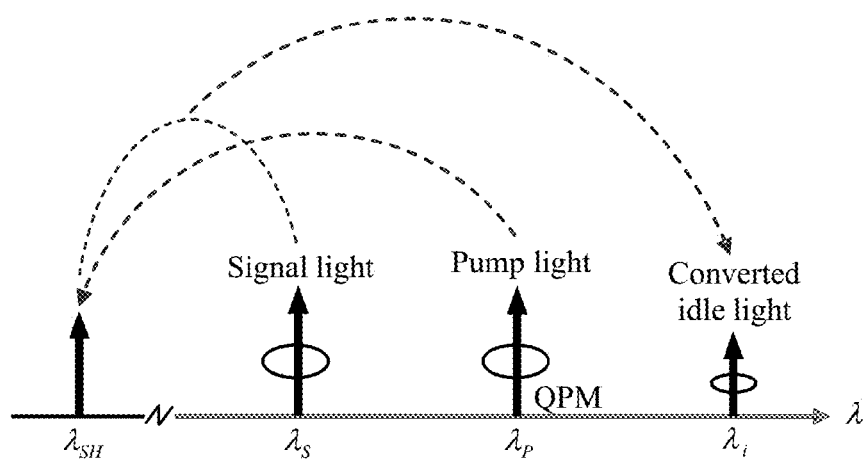
FIG. 4 and FIG. 5 are schematic diagrams of a second-order nonlinear optical effect according to an embodiment of the present disclosure.
Figure 5:
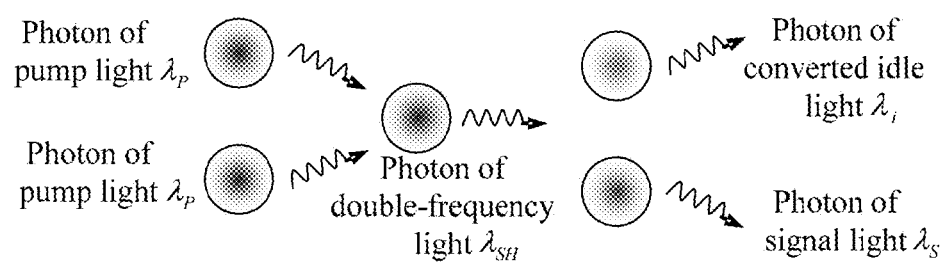

References are made to FIG. 4 and FIG. 5, the signal light ($\lambda_S$) and the control light ($\lambda_P$) transmitted along a same direction are inputted into the second-order nonlinear optical waveguide, and then the signal light ($\lambda_S$) and the control light ($\lambda_P$) experience the second-order nonlinear optical effect in the second-order nonlinear optical waveguide. Under the effect of the second-order nonlinear optical effect, photons of the control light ($\lambda_P$) are annihilated and photons of a double-frequency light ($\lambda_{SH}$) are generated. Meanwhile, the photons of the double-frequency light ($\lambda_{SH}$) are further converted to photons of the signal light ($\lambda_S$) and photons of a generated idle light ($\lambda_i$). The following equation is met by the wavelengths: $1/\lambda_{SH}=2/\lambda_P=1/\lambda_S+1/\lambda_i$. In terms of frequencies, the following equation is met by a frequency $f_{SH}$ of the double-frequency light, a frequency $f_P$ of the control light, a frequency $f_S$ of the signal light and a frequency $f_i$ of the generated idle light: $f_{SH}=2f_P=f_S+f_i$.

In this way, in a case that the signal light which carries the data information and the continuous control light transmitted in the same direction are input into the second-order nonlinear optical waveguide, the data information carried by the signal light is copied to the idle light under the second-order nonlinear effect, thereby implementing an all-optical wavelength conversion from the input signal light to the output idle light.

Figure 6:
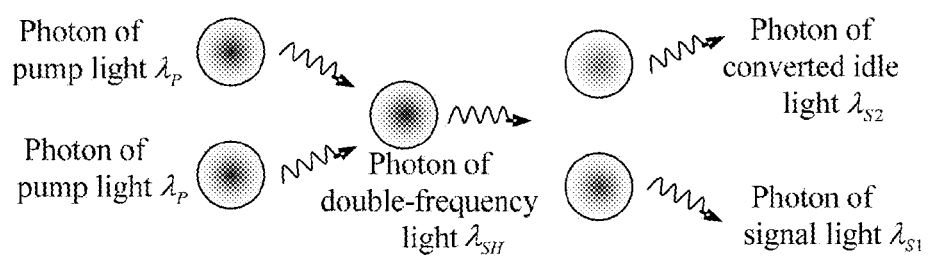
FIG. 6 and FIG. 7 are schematic diagrams of implementing all-optical information exchange based on a second-order nonlinear effect according to an embodiment of the present disclosure.
Figure 7:
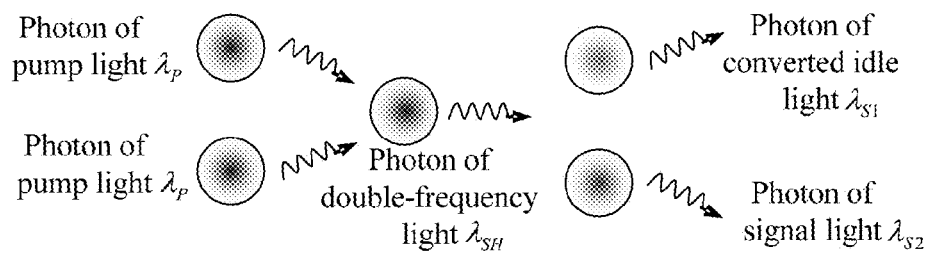

In the following consideration, it is assumed that an all-optical information exchange is required to be performed on the data information carried by two optical wavelengths $\lambda_{S1}$ and $\lambda_{S2}$. In a case that a signal light with the wavelength $\lambda_{S1}$ is used as the signal light ($\lambda_S$) described above, and it is assumed that the following equation is met by the wavelength $\lambda_P$ of the control light: $2/\lambda_P=1/\lambda_{S1}+1/\lambda_{S2}$, then a wavelength of a generated idle light is $\lambda_{S2}$ (as shown in FIG. 6) and the generated idle light with the wavelength $\lambda_{S2}$ carries the data information once carried by the signal light with the wavelength $\lambda_{S1}$ under the second-order nonlinear effect based on the above description. Similarly, in a case that a signal light with the wavelength $\lambda_{S2}$ is used as the signal light ($\lambda_S$) described above, and it is still assumed that the following equation is met by the wavelength $\lambda_P$ of the control light: $2/\lambda_P=1/\lambda_{S1}+1/\lambda_{S2}$, then the wavelength of the generated idle light is $\lambda_{S1}$ (as shown in FIG. 7) and the generated idle light with the wavelength $\lambda_{S1}$ carries the data information once carried by the signal light with the wavelength $\lambda_{S2}$ under the second-order nonlinear effect.

That is, in a case that it is assumed that the following equation is met by the wavelength $\lambda_P$ of the control light: $2/\lambda_P=1/\lambda_{S1}+1/\lambda_{S2}$ or another equation is met by the frequency $f_P$ of the control light, and frequencies $f_{S1}$ and $f_{S2}$ of the two signal lights: $2f_P=f_{S1}+f_{S2}$, the data information carried by the two optical wavelengths $\lambda_{S1}$ and $\lambda_{S2}$ can be exchanged.

After the operation principle of the second-order nonlinear optical waveguide is described, it is introduced how the components cooperate with each other to implement the all-optical information exchange hereinafter.

The first optical coupler 2, the first optical filter 5, the second optical filter 6, the third optical coupler 3, the second-order nonlinear optical waveguide 1 and the fourth optical coupler 4 described above form an annular structure.

Taken performing an all-optical information exchange on the data information carried by the two optical wavelengths $\lambda_{S1}$ and $\lambda_{S2}$ as an example, and it is assumed that the light with the wavelength $\lambda_{S1}$ can pass through the first optical filter 5 and the light with the wavelength $\lambda_{S2}$ can pass through the second optical filter. In a case that preset conditions are met (the preset conditions are described in detail hereinafter), the process of the all-optical information exchange is described as follows.

Figure 8:
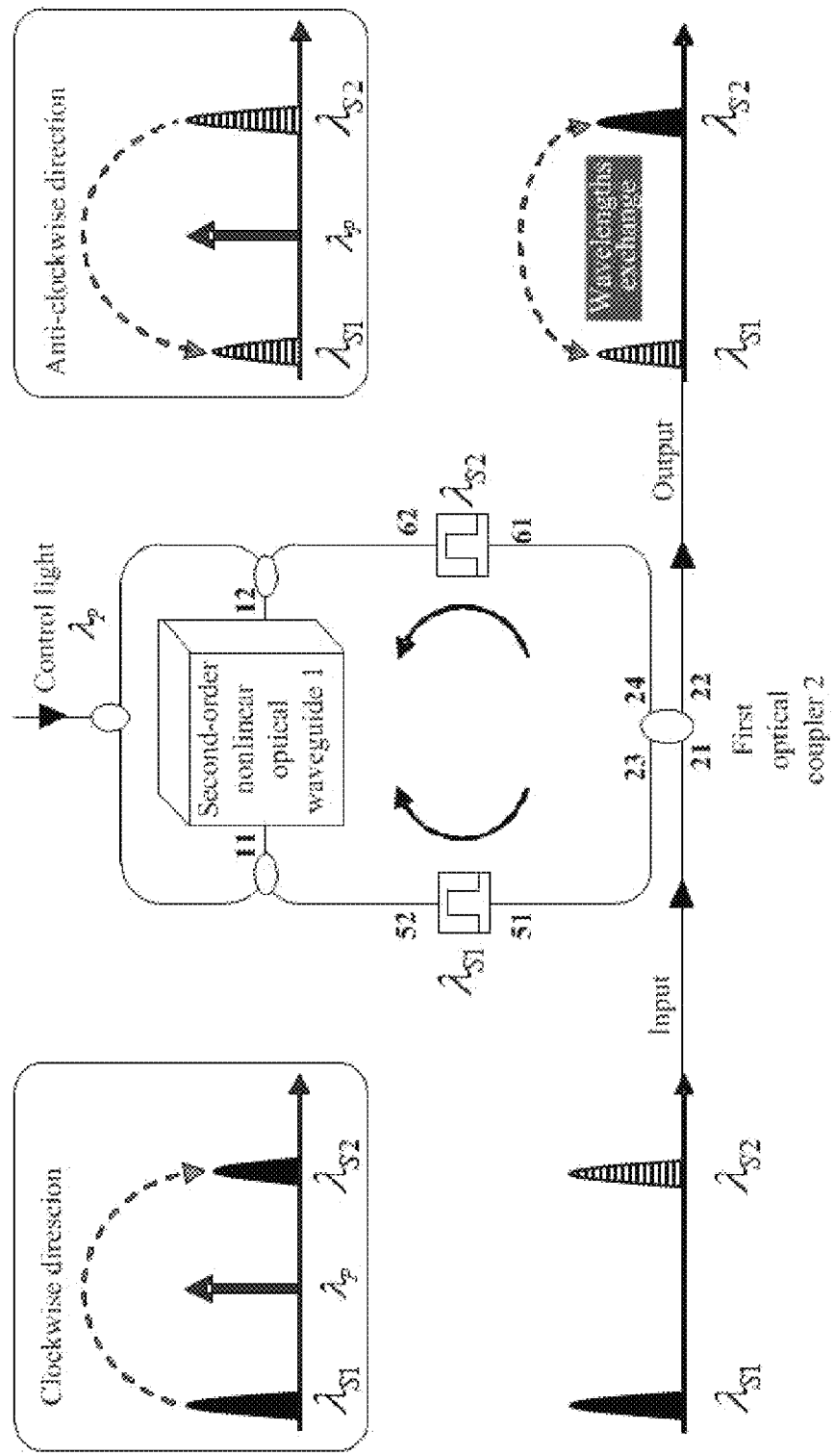
FIG. 8 is a schematic diagram of a process of all-optical information exchange of two wavelengths according to an embodiment of the present disclosure.

Reference is made to FIG. 8, a WDM signal light is split into two paths and then input into the annular structure under the effect of the first optical coupler 2. The two paths of the signal light are transmitted along opposite directions, one of the paths is transmitted along the clockwise direction in the annular structure, and the other of the paths is transmitted along the anti-clockwise direction in the annular structure. Two paths of a control light which are input from the second port 32 of the third optical coupler 3 and the second port 42 of the fourth optical coupler 4 are also transmitted along two opposite directions, one of the paths is transmitted along the clockwise direction in the annular structure, and the other of the paths is transmitted along the anti-clockwise direction in the annular structure.

In FIG. 8, the WDM signal transmitted along the clockwise direction is input into the first optical filter 5 via the third port 23 of the first optical coupler 2. The signal light with the wavelength $\lambda_{S1}$ can pass through the first optical filter 5, thus the signal light with the wavelength $\lambda_{S1}$ is output from the output port 52 of the first optical filter 5. The signal light $\lambda_{S1}$ and the control light which are transmitted along the clockwise direction are input from the first port 11 of the second-order nonlinear optical waveguide 1, the wavelength conversion occurs under the second-order nonlinear optical effect in the second-order nonlinear optical waveguide 1, and the wavelength which carries the data information is converted to $\lambda_{S2}$ from $\lambda_{S1}$ in a case that the following equation is met: $2/\lambda_P=1/\lambda_{S1}+1/\lambda_{S2}$.

It should be noted that, a multiplexed light output from the second port 12 of the second-order nonlinear optical waveguide 1 includes the light (the wavelength is $\lambda_{S2}$) which carries the data information and the light with the wavelength $\lambda_{S1}$. The multiplexed light is input from the second port 62 of the second optical filter 6. The signal light with the wavelength $\lambda_{S2}$ can pass through the second optical filter 6, thus the signal light with the wavelength $\lambda_{S2}$ is output from the first port 61 of the second optical filter 6 and carries the data information which once carried by the signal light with the wavelength $\lambda_{S1}$.

Reference is made to FIG. 8, the WDM signal transmitted along the clockwise direction is input into the second optical filter 6 via the fourth port 24 of the first optical coupler 2. The signal light with the wavelength $\lambda_{S2}$ can pass through the first optical filter 6, thus the signal light with the wavelength $\lambda_{S2}$ is output from the output port 62 of the second optical filter 6. The signal light with the wavelength $\lambda_{S2}$ and the control light which are transmitted along the anti-clockwise direction are input from the second port 12 of the second-order nonlinear optical waveguide 1, the wavelength conversion occurs under the second-order nonlinear optical effect in the second-order nonlinear optical waveguide 1, and the wavelength of the light which carries the data information is converted to $\Delta_{S1}$ from $\lambda_{S2}$ in a case that the following equation is met: $2/\lambda_P=1/\lambda_{S1}+1/\lambda_{S2}$.

It should be noted that, a multiplexed light output from the first port 11 of the second-order nonlinear optical waveguide 1 includes the light (the wavelength is $\lambda_{S1}$) which carries the data information and the light with the wavelength $\lambda_{S2}$. The multiplexed light is input from the second port 52 of the first optical filter 5. The signal light with the wavelength $\lambda_{S1}$ can pass through the first optical filter 5, thus the signal light with the wavelength $\lambda_{S1}$ is output from the first port 51 of the first optical filter 5 and carries the data information which once carried by the signal light with the wavelength $\lambda_{S1}$.

The signal light with the wavelength $\lambda_{S2}$ output from the first port 61 of the second optical filter 6 is input from the third port 23 of the first optical coupler, and the signal light with the wavelength $\lambda_{S1}$ output from the first port 51 of the first optical filter 5 is input from the fourth port 24 of the first optical coupler 2. The two signal lights are coupled in the first optical coupler. In this way, the signal light output from the second port 22 is also a multiplexed light, and the all-optical information exchange are implemented on the data information carried by the two optical wavelengths.

Besides the dual wavelengths, the all-optical information exchange device according to the present disclosure may be applied to all-optical wavebands exchange, that is, data information carried by a waveband signal light (a waveband includes multiple wavelengths) is copied to another waveband signal light (another waveband includes multiple wavelengths).

Figure 9:
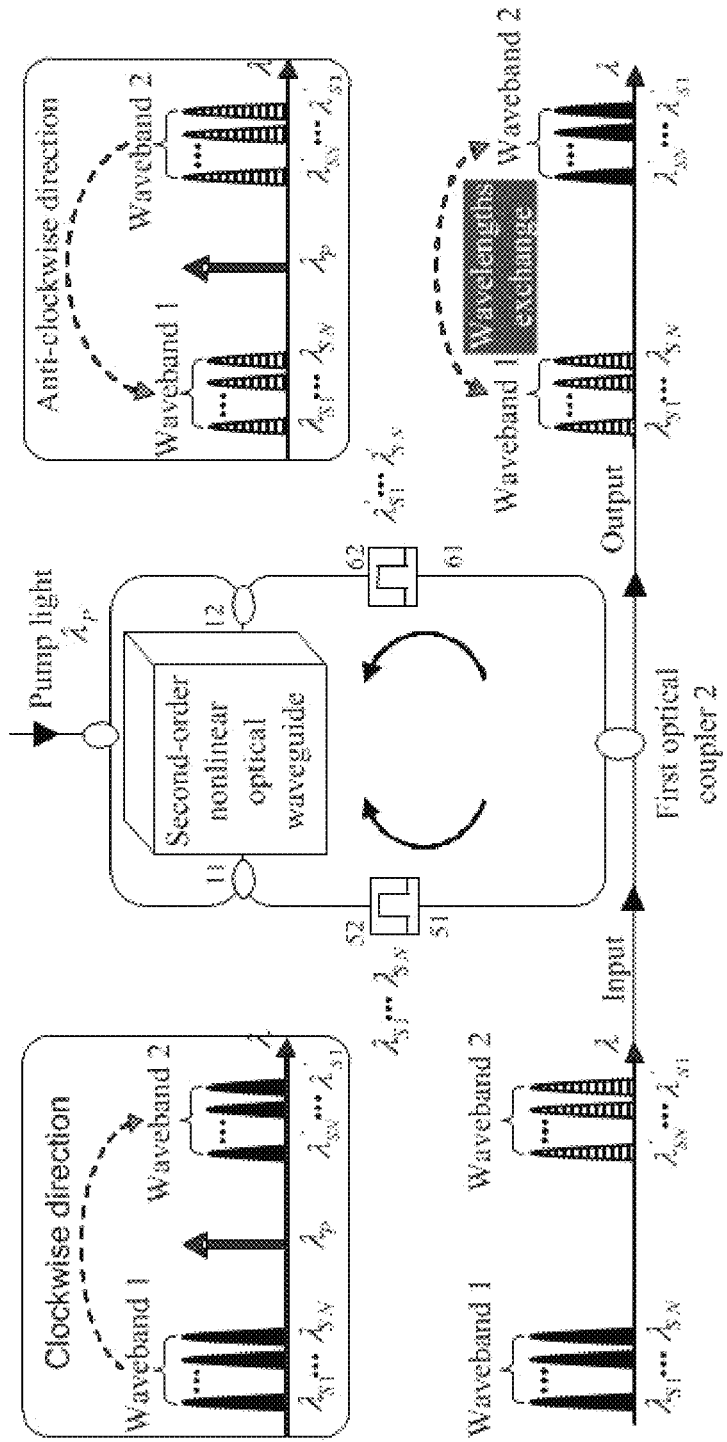
FIG. 9 is a schematic diagram of another process of all-optical information exchange of two wavebands according to an embodiment of the present disclosure.

FIG. 9 illustrates a process of implementing the controllable all-optical wavebands exchange (dual wavebands) based on the second-order nonlinear optical waveguide. The operation principle illustrated in FIG. 9 is similar to that in FIG. 8, the difference is that two waveband signal lights are input in the process of the all-optical wavebands exchange. One of the wavebands is $\lambda_{S1} \ldots \lambda_{SN}$, and the other of the wavebands is $\lambda'_{S1} \ldots \lambda'_{SN}$. All the wavelengths in each of the wavebands are distributed uniformly (or, nonuniformly). In a case that all the wavelengths in each of the wavebands are distributed uniformly, the following equation is met by the two wavebands and the control light $(\lambda_P)$: $2/\lambda_P = 1/\lambda_{S1} + 1/\lambda'_{SN} = 1/\lambda_{S2} + 1/\lambda'_{SN-1} \ldots = 1/\lambda_{SN} + 1/\lambda'_{S1}$. In other words, the frequency of the control light is twice as much as the sum of a center frequency of the first wavelength/waveband signal light and a center frequency of the second wavelength/waveband signal light. In a case that all the wavelengths in each of the wavebands are distributed nonuniformly, twice the frequency of the control light may be set to be equal to the sum of a center frequency of the first wavelength/waveband signal light and a center frequency of the second wavelength/waveband signal light.

Similarly, the first optical filer 5 and the second optical filter 6 are respectively transmissive to the above two wavebands. For example, the first optical filter is transmissive to the signal light with the waveband $\lambda_{S1} \ldots \lambda_{SN}$, and the second optical filter 6 is transmissive to the signal light with the waveband $\lambda'_{S1} \ldots \lambda'_{SN}$.

Furthermore, the polarization state of control light is consistent with polarization states of the two waveband signal lights and is consistent with a corresponding polarization state in which a best nonlinear effect occurs in the second-order nonlinear optical waveguide 1.

In this way, as shown in FIG. 9, the wavebands $\lambda_{S1} \ldots \lambda_{SN}$ can be respectively converted to the wavebands $\lambda'_{S1} \ldots \lambda'_{SN}$ in the clockwise direction, and the wavebands $\lambda'_{S1} \ldots \lambda'_{SN}$ can be respectively converted to the waveband $\lambda_{S1} \ldots \lambda_{SN}$ in the anti-clockwise direction. After filtering actions of the first optical filter 5 and the second optical filter 6 and a coupling action of the first optical coupler 2, the dual waveband signal lights on which the all-optical wavebands exchange is implemented are finally output.

In other embodiments of the present disclosure, the QPM wavelength of the second-order nonlinear optical waveguide may be tuned through temperature control. Furthermore, the first optical filter 5 and the second optical filter 6 are respectively transmissive to two tunable wavelengths or wavebands.

The above requirement is due to the fact that the two wavelengths ($\lambda_{S1}$ and $\lambda_{S2}$) or wavebands ($\lambda_{S1} \ldots \lambda_{SN}$ and $\lambda'_{S1} \ldots \lambda'_{SN}$) may change in practical applications. In order to implement the all-optical information exchange on the data information carried by the dual wavelength/waveband signal lights, the wavelength of the control light is selected to meet the following equation: $2/\lambda_P = 1/\lambda_{S1} + 1/\lambda_{S2}$, or, it is assumed that the frequency of the control light is twice as much as the sum of the center frequencies of the two wavelength/waveband signal lights.

In addition, in order to realize an effective cascaded second-order nonlinear effect, temperature control may be implemented on the second-order nonlinear optical waveguide to tune its QPM wavelength, so as to match the wavelength of the control light in a case that the wavelength of the control light changes. In this way, the controllable all-optical wavelengths or wavebands exchange can be implemented with one second-order nonlinear optical waveguide and two optical filters.

Of course, in a case that the all-optical wavelengths or wavebands exchange is implemented on more than two wavelength/waveband signal lights, the process may be carried out for several times.

Figure 10:
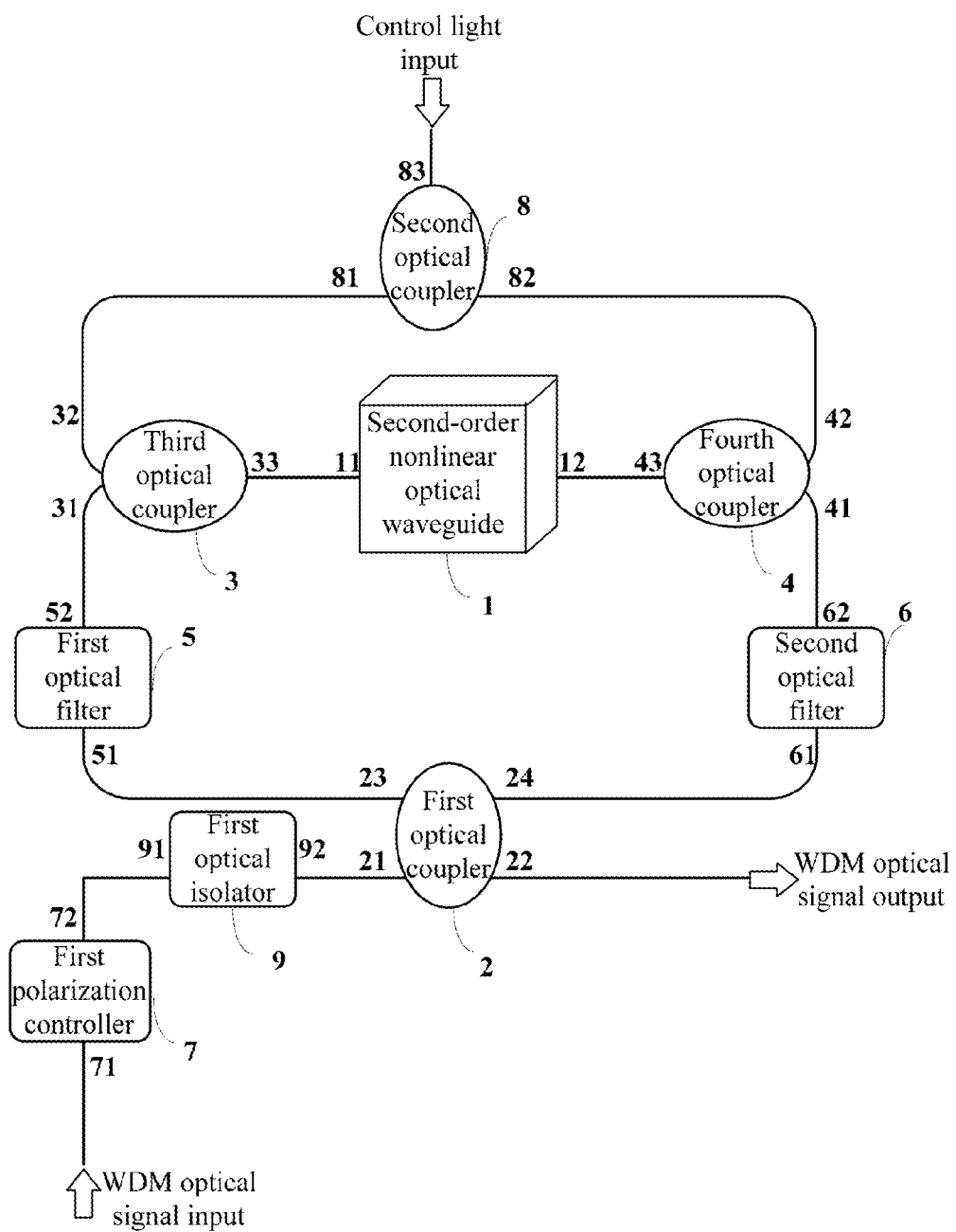
FIG. 10 is a schematic structural diagram of an all-optical information exchange device according to an embodiment of the present disclosure.

In order to ensure the one-way transmission of optical waves and avoid the effect of backward transmitted optical waves, in other embodiments of the present disclosure, the device according to any one of the above embodiments may further include a first optical isolator 9, as shown in FIG. 10.

The second port 72 of the first polarization controller 7 is connected to the first port 21 of the first optical coupler 2 via the first optical isolator 9: an input port 91 of the first optical isolator 9 is connected to the second port 72 of the first polarization controller 7, and an output port 92 of the first optical isolator is connected to the first port 21 of the first optical coupler 2.

Figure 11:
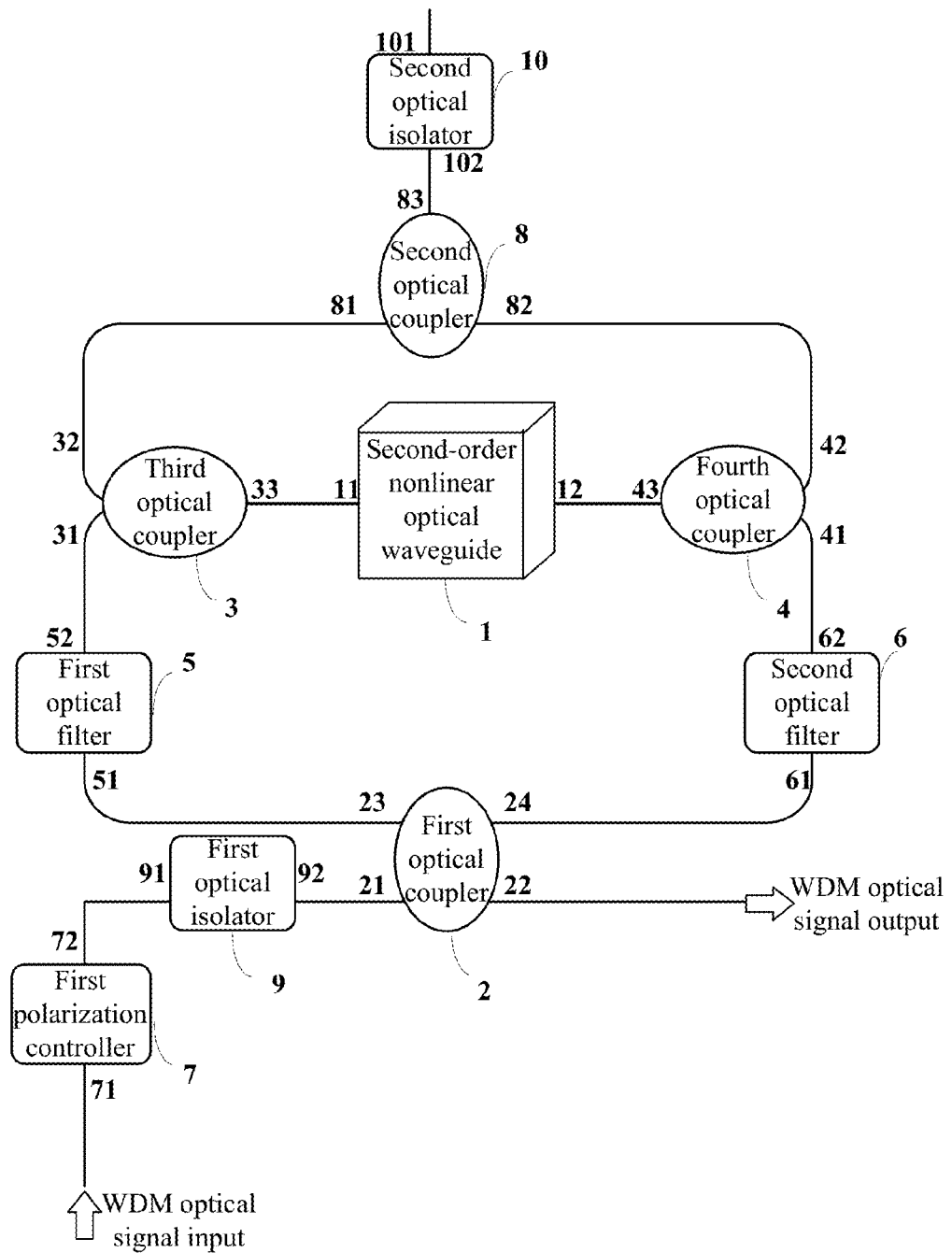
FIG. 11 is a schematic structural diagram of an all-optical information exchange device according to an embodiment of the present disclosure.

Similarly, in other embodiments of the present disclosure, the device according to any one of the above embodiments may further include a second optical isolator 10, as shown in FIG. 11.

Figure 12:
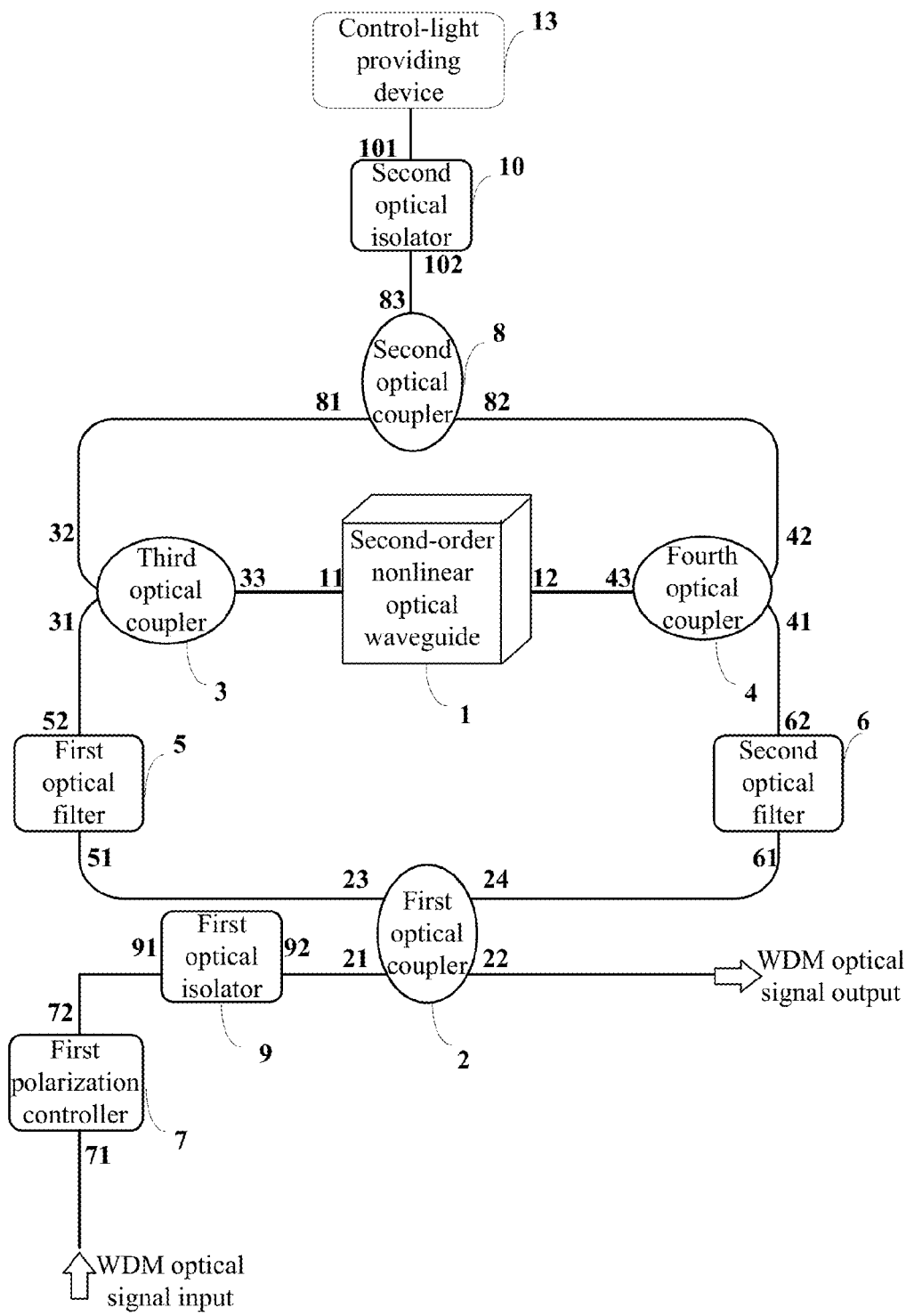
FIG. 12 is a schematic structural diagram of an all-optical information exchange device according to an embodiment of the present disclosure.

Furthermore, in other embodiments of the present disclosure, the device according to any one of the above embodiments may further include a control-light providing device 13, as shown in FIG. 12. The control-light providing device 13 is configured to provide the control light.

Figure 13:
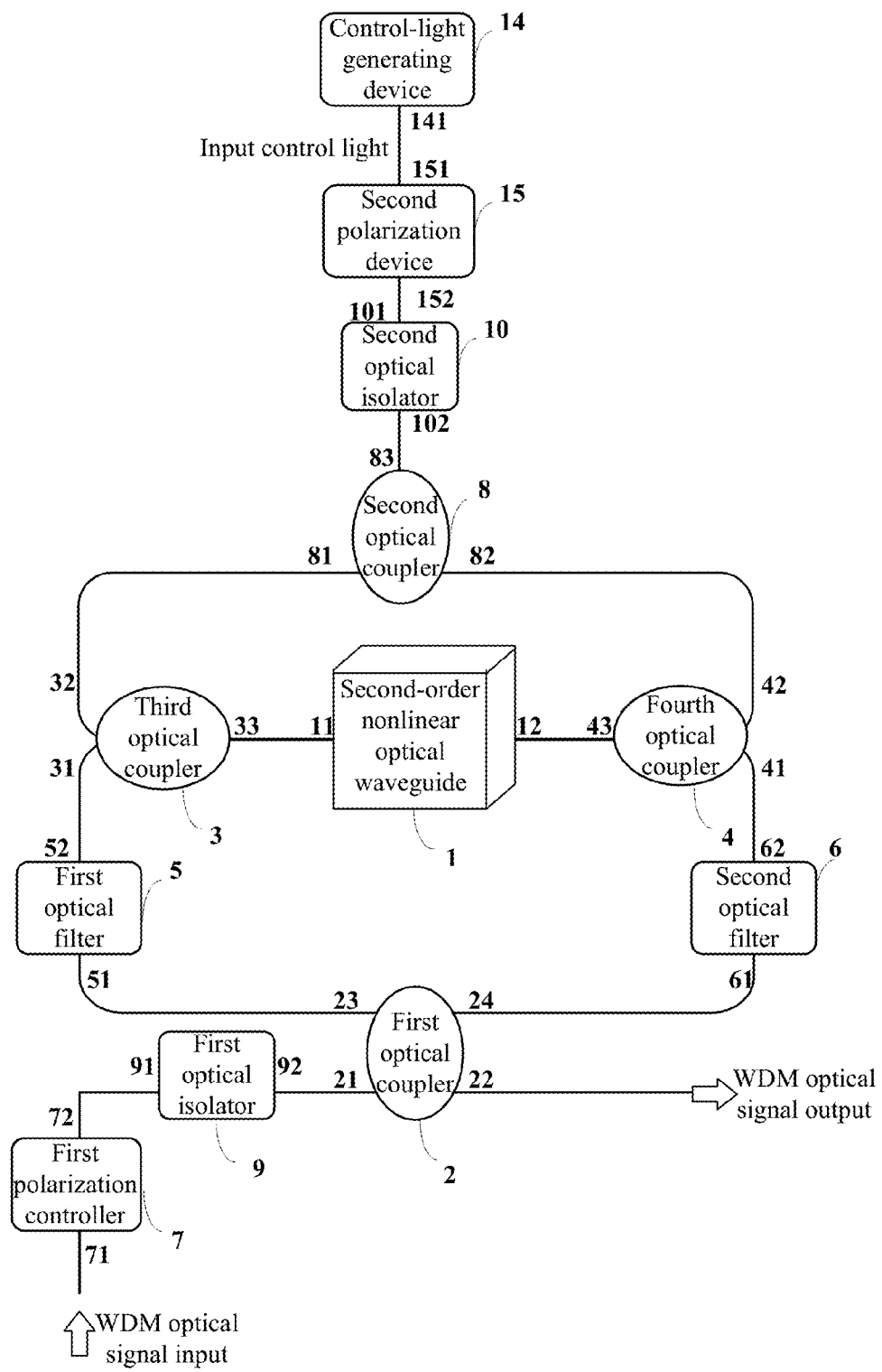
FIG. 13 is a schematic structural diagram of an all-optical information exchange device according to an embodiment of the present disclosure.

The control-light providing device 13 described above may include at least one of a control-light generating device 14 and a second polarization controller 15. FIG. 13 illustrates a case in which the control-light generating device 14 and the second polarization controller 15 are both provided. A first port 151 of the second polarization controller 15 is connected to an output port 141 of the control-light generating device 14, a second port 152 of the second polarization controller 15 is connected to an input port 101 of the second optical isolator 10, and an output port 102 of the second optical isolator 10 is connected to the third port 83 of the second optical coupler 8.

As described above, the polarization state corresponding to the second-order nonlinear optical waveguide 1, the polarization state of the input WDM signal light and the polarization state of the control light are consistent, the first polarization controller 7 may be configured to adjust the polarization state of inputted WDM signal light, and the second polarization controller 15 may be configured to adjust the polarization state of the control light. In this way, the polarization state of the input WDM signal light and the polarization state of the control light can be consistent with the polarization state corresponding to the second-order nonlinear optical waveguide 1, by controlling the first polarization controller 7 and the second polarization controller 15. Furthermore, the second-order nonlinear optical waveguide 1 may be provided with a polarization controller, in this case, the second polarization controller 15 is not provided.

Based on the all-optical information exchange device, an all-optical information exchange method is provided according to the embodiments of the present disclosure, the method is applied to exchanging the data information carried by the first wavelength/waveband signal light and the second wavelength/waveband signal light in the WDM signal light; and the method includes:

exchanging the data information carried by the first wavelength/waveband signal light and the second wavelength/waveband signal light in the WDM signal light, with the all-optical information exchange device, in a case that preset conditions are met.

Based on the above description, the preset conditions includes: the first optical filter 5 is transmissive to the first wavelength/waveband signal light; the second optical filter 6 is transmissive to the second wavelength/waveband signal light; the polarization state corresponding to the second-order nonlinear optical waveguide 1, the polarization state of the inputted WDM signal light and the polarization state of the control light are consistent; the wavelength of the control light is equal to the quasi-phase-matched wavelength of the second-order nonlinear optical waveguide; and the frequency of the control light is equal to the half of the sum of the center frequency of the first wavelength/waveband signal light and the center frequency of the second wavelength/waveband signal light.

Furthermore, it should be noted that the second-order nonlinear optical waveguide may be a periodically-poled lithium niobate optical waveguide or other optical waveguide with a second-order nonlinearity.

In conclusion, the present disclosure has the following advantages.

Firstly, in the conventional technology, the all-optical wavelengths exchange is implemented through a conversion process of an individual one-way wavelength, and the optical components such as two wavelength converters and four optical filters are used, thus the device is complex and the cost is high. For the all-optical information exchange device according to the present disclosure, a single wavelength converter (i.e., the second-order nonlinear optical waveguide 1) and two optical filters are used, the all-optical wavelengths conversion is implemented by intelligently using the annular structure, and the device is simple, thereby effectively reducing the cost.

Secondly, according to the present disclosure, the principle of the wavelength conversion based on the second-order nonlinear optical effect of the second-order nonlinear optical waveguide and the annular structure are combined, only one continuous control light without a high optical power is needed, not only the all-optical wavelengths exchange of the dual wavelengths but also the all-optical wavebands exchange can be implement. The implementation is simple, the power consumption is effectively reduced, and the function of the all-optical exchange is improved.

Thirdly, for the all-optical information exchange device according to the present disclosure, the all-optical information exchange can be implemented by accordingly tuning the wavelength of the control light and performing the temperature control on the quasi-phase-matched wavelength of the second-order nonlinear optical waveguide, thus the function of the all-optical exchange can be flexibly tunned in the practical applications.

Fourthly, for the all-optical information exchange device according to the present disclosure, the components used in the device for all-optical exchange are all passive components, and the exchange is implemented based on the second-order nonlinear effect. The device has a property that the response rate is ultrafast (on the order of femtoseconds), thus the device is applicable to the all-optical wavelengths/wavebands exchange with a rate of 40 Gbit/s, 160 Gbit/s, 640 Gbit/s and even an ultrafast rate of Tbit/s.

Fifthly, for the device all-optical information exchange device according to the present disclosure, the second-order nonlinear optical effect of the second-order nonlinear optical waveguide is used, the conversion process of the two-way wavelengths/wavebands has a property that the up-conversion efficiency and the down-conversion efficiency of the wavelengths are comparable, and the noise is low in the process of the nonlinear interactions, thus the device has a good performance in the all-optical wavelengths/wavebands exchange.

Various embodiments in the specification are described in a progressive manner, the differences from other embodiments are emphatically illustrated in each embodiment, and reference can be made to other embodiments for understanding the same or similar parts of the embodiments.

The above description of the disclosed embodiments can enable those skilled in the art to practice or use the present disclosure. Multiple modifications to these embodiments are apparent to those skilled in the art, and the general principles defined herein may be implemented in other embodiments without departing from the spirit or scope of the disclosure. Hence, the present disclosure is not limited to these embodiments disclosed herein but is to conform to the widest scope consistent with the principles and novel features disclosed herein.

What is claimed is:

1. An all-optical information exchange device, comprising:
   a second-order nonlinear optical waveguide, a first optical coupler, a third optical coupler, a fourth optical coupler, a first optical filter, a second optical filter and a first polarization controller; wherein,
   a first port of the first polarization controller is configured as an input port for a wavelength division multiplexing (WDM) signal light, and a second port of the first polarization controller is connected to a first port of the first optical coupler;
   a second port of the first optical coupler is configured as an output port for the WDM signal light, a third port of the first optical coupler is connected to a first port of the first optical filter, and a forth port of the first optical coupler is connected to a first port of the second optical filter;
   a second port of the first optical filter is connected to a first port of the third optical coupler, and second port of second optical filter is connected to a first port of the fourth optical coupler;
   a first port of the second-order nonlinear optical waveguide is connected to a third port of the third optical coupler, a second port of the second-order nonlinear optical waveguide is connected to a third port of the fourth optical coupler;
   a second port of the third optical coupler and a second port of the fourth optical coupler are configured as input ports for a control light respectively; and
   the WDM signal light comprises a first wavelength/waveband signal light and a second wavelength/waveband signal light, the first optical filter is transmissive to the first wavelength/waveband signal light, and the second optical filter is transmissive to the second wavelength/waveband signal light during use.

2. The device according to claim 1, further comprising a first optical isolator, wherein the second port of the first polarization controller is connected to the first port of the first optical coupler via the first optical isolator, an input port of the first optical isolator is connected to the second port of the first polarization controller, and an output port of the first optical isolator is connected to the first port of the first optical coupler.

3. The device according to claim 1, further comprising a second optical coupler, wherein a first port of the second optical coupler is connected to the second port of the third optical coupler, and a second port of the second optical coupler is connected to the second port of the fourth optical coupler.

4. The device according to claim 3, further comprising a control-light providing device.

5. The device according to claim 4, wherein the control-light providing device comprises at least one of a control-light generating device and a second polarization controller.

6. The device according to claim 5, further comprising a second optical isolator, wherein a first port of the second polarization controller is connected to an output port of the control-light generating device, a second port of the second polarization controller is connected to an input port of the second optical isolator, and an output port of the second optical isolator is connected to a third port of the second optical coupler.

7. The device according to claim 1, wherein the second-order nonlinear optical waveguide comprises an optical waveguide with a second-order nonlinear optical effect, and the second-order nonlinear optical effect includes a double-frequency effect, a sum-frequency effect or a difference-frequency effect.

8. The device according to claim 7, wherein the optical waveguide with the second-order nonlinear optical effect is a periodically-poled lithium niobate optical waveguide.

9. An all-optical information exchange method, implemented in an all-optical information exchange device, wherein the all-optical information exchange device comprises:

a second-order nonlinear optical waveguide, a first optical coupler, a third optical coupler, a fourth optical coupler, a first optical filter, a second optical filter and a first polarization controller; wherein, a first port of the first polarization controller is configured as an input port for a wavelength division multiplexing (WDM) signal light, and a second port of the first polarization controller is connected to a first port of the first optical coupler;

a second port of the first optical coupler is configured as an output port for the WDM signal light, a third port of the first optical coupler is connected to a first port of the first optical filter, and a forth port of the first optical coupler is connected to a first port of the second optical filter;

a second port of the first optical filter is connected to a first port of the third optical coupler, and second port of second optical filter is connected to a first port of the fourth optical coupler;

a first port of the second-order nonlinear optical waveguide is connected to a third port of the third optical coupler, a second port of the second-order nonlinear optical waveguide is connected to a third port of the fourth optical coupler;

a second port of the third optical coupler and a second port of the fourth optical coupler are configured as input ports for a control light respectively; and the WDM signal light comprises a first wavelength/waveband signal light and a second wavelength/waveband signal light, the first optical filter is transmissive to the first wavelength/waveband signal light, and the second optical filter is transmissive to the second wavelength/waveband signal light during use;

wherein the method is applied to exchanging data information carried by the first wavelength/waveband signal light and the second wavelength/waveband signal light in the WDM signal light;

wherein the method comprises:

exchanging the data information carried by the first wavelength/waveband signal light and the second wavelength/waveband signal light in the WDM signal light, with the all-optical information exchange device, in a case that preset conditions are met; and the preset conditions comprise: the first optical filter is transmissive to the first wavelength/waveband signal light; the second optical filter is transmissive to the second wavelength/waveband signal light; a polarization state corresponding to the second-order nonlinear optical waveguide, a polarization state of the inputted WDM signal light and a polarization state of the control light are consistent; a wavelength of the control light is equal to a quasi-phase-matched wavelength of the second-order nonlinear optical waveguide; and a frequency of the control light is equal to a half of a sum of a center frequency of the first wavelength/waveband signal light and a center frequency of the second wavelength/waveband signal light.

* * * * *